(12) United States Patent
Mukhi et al.

(10) Patent No.: US 9,372,603 B2
(45) Date of Patent: Jun. 21, 2016

(54) DATA SAMPLING METHOD FOR DETERMINING SALIENT VALUES IN A LARGE DATA STREAM

(71) Applicant: Air Liquide Electronics US LP, Houston, TX (US)

(72) Inventors: Sultan Q. Mukhi, Houston, TX (US); Emitaz A. Momin, Houston, TX (US); Mehrab Momin, Houston, TX (US)

(73) Assignee: Air Liquide Large Industries U.S. LP, Houston, TX (US)

( * ) Notice: Subject to any disclaimer, the term of this patent is extended or adjusted under 35 U.S.C. 154(b) by 427 days.

(21) Appl. No.: 13/796,274

(22) Filed: Mar. 12, 2013

(65) Prior Publication Data

US 2014/0282168 A1 Sep. 18, 2014

(51) Int. Cl.
*G06F 3/0484* (2013.01)
*G05B 23/02* (2006.01)
*G05B 19/418* (2006.01)

(52) U.S. Cl.
CPC .......... *G06F 3/0484* (2013.01); *G05B 19/4185* (2013.01); *G05B 23/0216* (2013.01); *G05B 23/0221* (2013.01); *G05B 2219/32128* (2013.01); *Y02P 90/18* (2015.11)

(58) Field of Classification Search
CPC ............. G06F 8/34; G06F 3/00; G06F 3/048; G06F 3/0481; G06F 3/0482; G06F 3/0484; G06F 3/04847; G05B 19/0426; G05B 2219/23256; G06T 11/206
See application file for complete search history.

(56) References Cited

U.S. PATENT DOCUMENTS

| 3,971,000 | A | * | 7/1976 | Cromwell | G06F 3/04895 700/84 |
|---|---|---|---|---|---|
| 4,303,973 | A | * | 12/1981 | Williamson, Jr. | G05B 15/02 700/80 |
| 4,792,888 | A | * | 12/1988 | Agarwal | G05B 23/02 700/83 |
| 5,353,400 | A | * | 10/1994 | Nigawara | G05B 23/0272 715/771 |
| 5,588,109 | A | * | 12/1996 | Dickinson | G05B 19/042 715/740 |
| 7,380,213 | B2 | * | 5/2008 | Pokorny et al. | 715/764 |
| 7,432,926 | B1 | | 10/2008 | Cherkas | |
| 2003/0020751 | A1 | * | 1/2003 | Safa | G06F 17/30896 715/760 |
| 2004/0230643 | A1 | * | 11/2004 | Thibault | G05B 19/41835 709/201 |
| 2005/0114500 | A1 | * | 5/2005 | Monk | H04L 12/2602 709/224 |

(Continued)

OTHER PUBLICATIONS

International Search Report and Written Opinion for PCT/US2014/024057, Dec. 8, 2014.

*Primary Examiner* — Xiomar L Bautista
(74) *Attorney, Agent, or Firm* — Elwood L. Haynes

(57) ABSTRACT

Techniques are disclosed for presenting users with relevant data and statistics related to the operations of an industrial system. Data obtained by a SCADA system may be stored in a real-time status database (which reflects the current process data of the industrial system) and a historian database (which archives the process data from the industrial system as it changes over time). A user may request from the SCADA system process data obtained during a specified period of time. The request may be subdivided into a plurality of time intervals, and process data associated with each time interval may be analyzed to determine one or more salient values that are representative of the interval. The salient values associated with each time interval then may be transmitted to the user in response to the process data request.

19 Claims, 6 Drawing Sheets

(56) References Cited

U.S. PATENT DOCUMENTS

| | | | |
|---|---|---|---|
| 2006/0004842 A1 | 1/2006 | Wu et al. | |
| 2006/0294129 A1 | 12/2006 | Stanfill et al. | |
| 2007/0165031 A1* | 7/2007 | Gilbert | G05B 19/0426 345/473 |
| 2008/0117213 A1 | 5/2008 | Cirit et al. | |
| 2009/0172559 A1* | 7/2009 | Waldman | G06F 17/211 715/744 |
| 2009/0313187 A1* | 12/2009 | Miller | 706/11 |
| 2010/0017698 A1 | 1/2010 | Hills et al. | |
| 2010/0329642 A1* | 12/2010 | Kam | G06F 3/04817 386/280 |
| 2011/0276377 A1* | 11/2011 | Kim et al. | 705/14.17 |
| 2012/0023429 A1* | 1/2012 | Medhi | G06F 11/323 715/772 |
| 2014/0108985 A1* | 4/2014 | Scott et al. | 715/771 |

* cited by examiner

DATA SAMPLING METHOD FOR DETERMINING SALIENT VALUES IN A LARGE DATA STREAM

BACKGROUND OF THE INVENTION

1. Field of the Invention

The present invention generally relates to processing and transmitting data associated with a monitored industrial system.

2. Description of the Related Art

Generally, a pipeline system provides a continuous pipe conduit that includes a variety of components and equipment (e.g., valves, compressor stations, communications systems, and meters). A pipeline may be used to transport liquid or gaseous materials from one point to another, usually from one point (or points) of production or processing to another, or to points of use. For example, an air separation unit may be used to separate atmospheric air into gaseous components (e.g., oxygen gas ($O_2$), nitrogen gas ($N_2$), hydrogen gas ($H_2$), Argon gas (Ar), etc.). At compressor stations, compressors maintain the pressure of the material in the pipeline as it is transported from one site to another. Similarly, for a liquid bearing pipeline, pumps may be used to introduce and maintain pressure for a liquid substance transported by the pipeline.

Running and maintaining a pipeline system can be expensive and complex, and the operations of a pipeline system are frequently coordinated and controlled from a central operations control center. At such a control center, an operator may monitor process data related to the operational state of the pipeline and each of its constituent elements using a SCADA (Supervisory Control and Data Acquisition) system. Other complex industrial systems and processes use a similar approach. For example, a petroleum refinery (at one end of a pipeline) may be monitored from a central control center using a real-time status database configured to receive data collected from the field devices of the refinery. Similarly, chemical production or processing facilities, steel mills, manufacturing plants, assembly lines, etc., are frequently monitored using a centralized operations control center.

Process data obtained by the SCADA system may be transmitted to users for analysis. However, due to network bandwidth limitations, local and remote users may wait long periods of time to receive the large amounts of data obtained by the SCADA system. As a result, data received for analysis may be stale, preventing analysts from identifying real-time trends or detecting trends, inefficiencies, malfunctions, etc. in a timely manner.

Accordingly, there is a need in the art for a more effective way of transmitting process data to local and remote users.

SUMMARY OF THE INVENTION

One embodiment of the present invention includes a method for fulfilling a request for process data related to the operations of a system. This method may generally include receiving, from an application program executing on a client computing system, a first selected interval granularity and a request for process data associated with a first time period and dividing the first time period into a first plurality of intervals based on the first selected interval granularity. This method may also include, for each interval in the first plurality of intervals, analyzing the process data of the monitored system to determine salient values. The salient values may include at least an initial value, a maximum value, a minimum value, and any local extrema of the process data of the monitored system. This method may also include transmitting the salient values associated with the first plurality of intervals to the application program. The application program is configured to render a graph of the process data according to the first selected interval granularity, wherein the graph preserves the salient values irrespective of the selected interval granularity.

Further embodiments provide a non-transitory computer-readable medium and a computing device to carry out the method set forth above.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
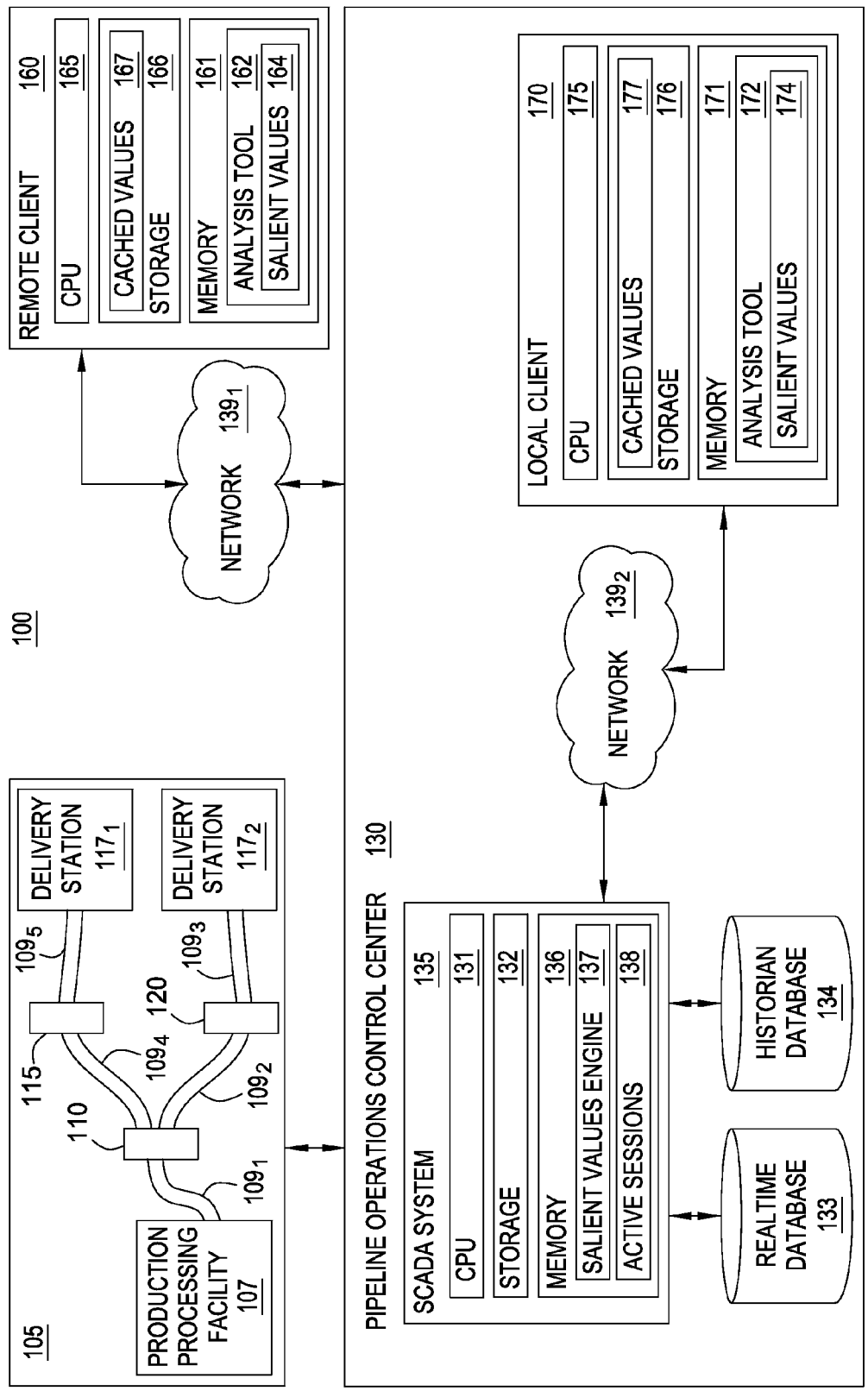
FIG. 1 illustrates a system that includes a monitored pipeline network and an operations control center, according to one embodiment.

Embodiments of the invention provide techniques for presenting users with relevant data and statistics related to the operations of an industrial system. Data obtained by a SCADA system may be stored in a real-time status database (which reflects the current process data of the industrial system) and a historian database (which archives the process data from the industrial system as it changes over time). A user may make a request to the SCADA system for process data obtained during a specified time period. The request may be subdivided into a plurality of intervals, and process data associated with each interval may be analyzed to determine one or more salient values that are representative of the interval. The salient values associated with each interval then may be transmitted to the user in response to the data request.

In one embodiment, the user may select an interval granularity, and the period of time for which process data is requested may be divided into a plurality of intervals based on the interval granularity. For example, the user may specify a desired number of intervals (e.g., 50, 400, 1000, etc.), a desired duration of each interval (e.g., 30 seconds, 5 minutes, 1 hour, etc.), and/or the desired number of data points (e.g., 10 samples, 500 samples, 1000 samples, etc.) for which salient values are to be determined. Additionally, the user may expand, reduce, shift, or otherwise alter the time period for which process data is to be analyzed. In response to receiving an updated time period and/or interval granularity from the user, process data may be re-analyzed for each of the updated intervals. Salient values determined for each time interval are then transmitted to the user. Doing so allows a user to efficiently control the amount of information received from the SCADA system.

The process data associated with each time interval may be analyzed to determine a variety of salient values, including, e.g., the initial value, maximum value, and minimum value obtained by the SCADA system during each interval. This analysis ensures that the peaks and valleys associated with each interval are captured and stored. Further, other types of values which accurately represent characteristics and/or trends of the process data associated with each interval, such as the average value, standard deviation, etc., may be determined and transmitted to the user. Prior to transmitting the salient values to the user, the salient values may be sorted, reordered, and/or compared to detect redundancy. In one embodiment, the salient values associated with each time interval may be typed, sorted, and arranged in a specified order. In addition, salient values associated with a particular interval may be compared to previous and/or subsequent intervals to detect redundant data. For example, the salient values associated with a particular interval may be compared to values associated with the previous interval to determine that the values are substantially the same. In response to such a determination, the salient values associated with the intervals may be consolidated, for example, by removing one or more salient values prior to transmitting the values to the user.

In sum, large amounts of process data related to the operations of an industrial system may be divided into discrete intervals and the process data associated with each interval may be analyzed to determine one or more salient values representative of the interval. The salient values then may be transmitted to the user in response to the request, as reflected in the time interval data. Accordingly, this approach enables users connected through a network having limited bandwidth to quickly and efficiently access and analyze industrial process data to identify real-time trends, malfunctions, inefficiencies, and the like.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified a FIG. 1 is an illustration of a monitored pipeline and an operations control center, according to one embodiment of the invention;

FIG. 1 illustrates a system 100 that includes a monitored pipeline network 105 and an operations control center 130, according to one embodiment of the invention. As shown, monitored pipeline network 105 includes a production/processing facility 107 and delivery station $117_{1-2}$. Facility 107 may represent, for example, a molecular gas generation plant that includes one or more air separation units used to purify gaseous substances from the ambient atmosphere. The resulting product is delivered to stations $117_{1-2}$ over a pressurized gas pipeline. Illustratively, pipeline 105 includes pipeline segments $109_{1-5}$. Pipeline segments $109_1$, $109_2$, and $109_3$, provide a path from facility 107 to delivery station $117_2$ and pipeline segments $109_1$, $109_4$ and $109_5$ provide a path from facility 107 to delivery station $117_1$. Additionally, pipeline 105 includes compressor stations 110, 115, and 120 used to maintain the pressure of gaseous substances transported over pipeline 105.

Compressor stations 110, 115, and 120 may include sensor equipment used to monitor aspects of the operational state of the pipeline 105. For a pressurized gas pipeline, for example, a wide variety of field devices and parameters may be monitored including, for example, inlet gas pressure, outlet gas pressure, gas temperature, cooling liquid temperature, flow rates, and power consumption, among others. Similarly, the operational state of various field devices, air separation units, and equipment at production facility 107 and delivery station 117 may be monitored by sensor equipment. Of course, for other industrial networks and systems, the sensors and monitoring equipment may be selected to suit the needs of a particular case.

In one embodiment, the results of the monitoring equipment are transmitted to the pipeline operations control center 130. The pipeline operation control center 130 may employ a number of computer systems running application programs used to coordinate, monitor, and control the operations of pipeline 105. Illustratively, pipeline operations control center 130 includes a SCADA (Supervisory Control and Data Acquisition) system 135, a real-time database 133, and a historian database 134, and a local client 170, each communicating over a network $139_2$. Additionally, a remote client 160 communicates over a wide area network $139_1$ (e.g., the Internet) with the computer systems of the operations control center 130. For example, a user may interact with an analysis tool 162 to access SCADA data over the network $139_1$. The computer systems 135, 133, 134, 160 and 170 are included to be representative of existing computer systems, e.g., desktop computers, server computers, laptop computers, tablet computers, and the like. However, embodiments of the invention are not limited to any particular computing system, application, device, architecture or network, and instead, may be adapted to take advantage of new computing systems and platforms as they become available. Additionally, one skilled in the art will recognize that the illustrations of computer systems 135, 133, 134, 160 and 170 are simplified to highlight aspects of the present invention and that computing systems and networks typically include a variety of components not shown in FIG. 1.

As shown, SCADA system 135 includes a CPU 131, storage 132, and a memory 136. Similarly, local client 170 includes a CPU 175, storage 176, and memory 171. CPUs 131 and 175 are included to be representative of a single CPU, multiple CPUs, a single CPU having multiple processing cores, and the like. Memory 136 and 171 may be a random access memory. While the memory 136 and 171 is shown as a single entity, it should be understood that the memory 136 and 171 may comprise a plurality of modules, and that the memory 136 and 171 may exist at multiple levels, from high speed registers and caches to lower speed but larger DRAM chips. Storage 132 and 176 may be hard disk drive or solid-state drive storage devices. Storage 132 and 176 may also be a combination of fixed and/or removable storage devices, such as fixed disc drives, removable memory cards, or optical storage, etc.

As shown, the memory 136 of the SCADA system 135 includes a salient values engine 137 and one or more active sessions 138. SCADA system 135 centralizes process data and allows remote monitoring and control of pipeline 105. Illustratively, the SCADA 135 system is configured to gather data in real-time from remote locations in order to control equipment and monitor conditions in pipeline 105. The monitored data may be stored in real-time database 133. The real-time database 133 is generally used to store the last known value for each element or component of an industrial system (e.g., pipeline 105) monitored using system 100. That is, the real-time database 133 may store data values each representing a monitored parameter of pipeline 105 and the current operational value of that parameter. The data may be written into real-time database 133 periodically, where values are updated at regular intervals, or exception based, where a new values are written into real-time database 133 when the monitored value changes more than a predetermined value. SCADA system 135 may include both hardware and software components. The hardware gathers and feeds data into SCADA system 135, which processes this data and presents it to a user on local client 170. In one embodiment, a historian database 134 may be configured to retrieve (or receive) the values for monitored parameters from real-time database 133. Thus, the historian database 134 provides an archive of values from the real-time database 133.

In one embodiment, the salient values engine 137 manages process data requests received from a user of local client 170 (or remote client 160). For example, a user seeking to remotely access a large volume of data located on the SCADA system 135 may interact with an analysis tool 172 on remote client 160 to connect to the salient values engine 137 executing on SCADA system 135. The user then may request process data acquired during a particular time period. In response, the salient values engine 137 divides the time period into a plurality of intervals and returns process data that preserves the most salient values for each interval. Additionally, a user may update the time period for which process data is requested and/or specify a different interval granularity for which salient values are returned. In response, the salient values engine 137 returns updated salient values to the local client 170. In one embodiment, the salient values engine 137 creates an active session 138 for each user, associates user-specified parameters (e.g., time period, interval granularity, salient value types, etc.) with each active session 138, and provides updated salient values to each user when additional process data is received by the real-time database 133.

The amount of process data returned to the user may depend on the interval granularity specified by the user. For example, when the interval granularity is increased, the time period may be divided into a greater number of intervals. As a result, more process data may be returned to the user. Conversely, when the interval granularity is decreased, the time period may be divided into fewer intervals, and less process data may be returned to the user. Thus, the user can adjust the interval granularity to refine the amount of process data returned by the SCADA system 135. That is, when more process data is desired (e.g., for performing detailed analyses), the interval granularity may be increased, and when less process data is desired (e.g., to decrease latency and/or data transmission times if the user is connected to the SCADA system 135 through a network having limited bandwidth), the interval granularity may be decreased. At the same time, regardless of the amount of process data, the salient values are preserved in the data returned to a client. Accordingly, the techniques described herein dramatically improve upon conventional methods, which typically sample process data in a periodic manner and fail to capture relevant characteristics (e.g., data fluctuations, local minimum and maximum values).

When executed by the local client 170 (or remote client 160), the analysis tool 172 may present a user with graphs, tables, statistics, etc. presenting the process data captured by the SCADA system 135. The analysis tool 172 may be configured to preserve both current salient values received from the SCADA system 135 as well as and cached values 177 previously received from the SCADA system 135 and stored in storage 176. In one embodiment, salient values may include an initial value, maximum value, and minimum value associated with each interval in the time period. The analysis tool 172 then may present the data for the each interval included in the specified time period, again preserving the salient values.

In one embodiment, the SCADA system 135 may monitor the gas temperature and gas pressure of a pipeline used to transport pressurized gas from production processing facility 107 to delivery station $117_1$. In such a case, in response to a request from the analysis tool 172 for pipeline data acquired during a specified time period, the salient values engine 137 may divide the time period into a plurality of intervals corresponding to the time period. For each interval, the salient values engine 137 determines an initial value, maximum value, and minimum value and transmits the values to the analysis tool 172. When received, the analysis tool 172 updates one or more graphs with the process data and displays the updated graphs and salient values to the user.

Transmitting a smaller volume of process data to the analysis tool 172, while retaining salient values associated with the process data, significantly decreases the bandwidth requirements and latency associated with fulfilling requests from the local client 170 (and remote client 160). In particular, a remote client 160 connected to the SCADA system 135 through a limited-bandwidth and/or high latency network may experience significant increases in the speed with which he or she is able to receive and navigate large amounts of process data. As a result, users are able to perform real-time analysis of trends, inefficiencies, and malfunctions associated with an industrial process. The types of salient values (e.g., initial, maximum, minimum, etc.) transmitted by the salient values engine 137 may be selected base on the categories of processes monitored by the operations control center 130. Further, although real-time database 133, historian system 134, SCADA system 135, and local client 170, are shown as separate components, one of ordinary skill in the art will recognize that these components may be applications running on a single computer system, or on multiple computer systems, and further, that these components may be configured in a variety of ways.

Figure 2:
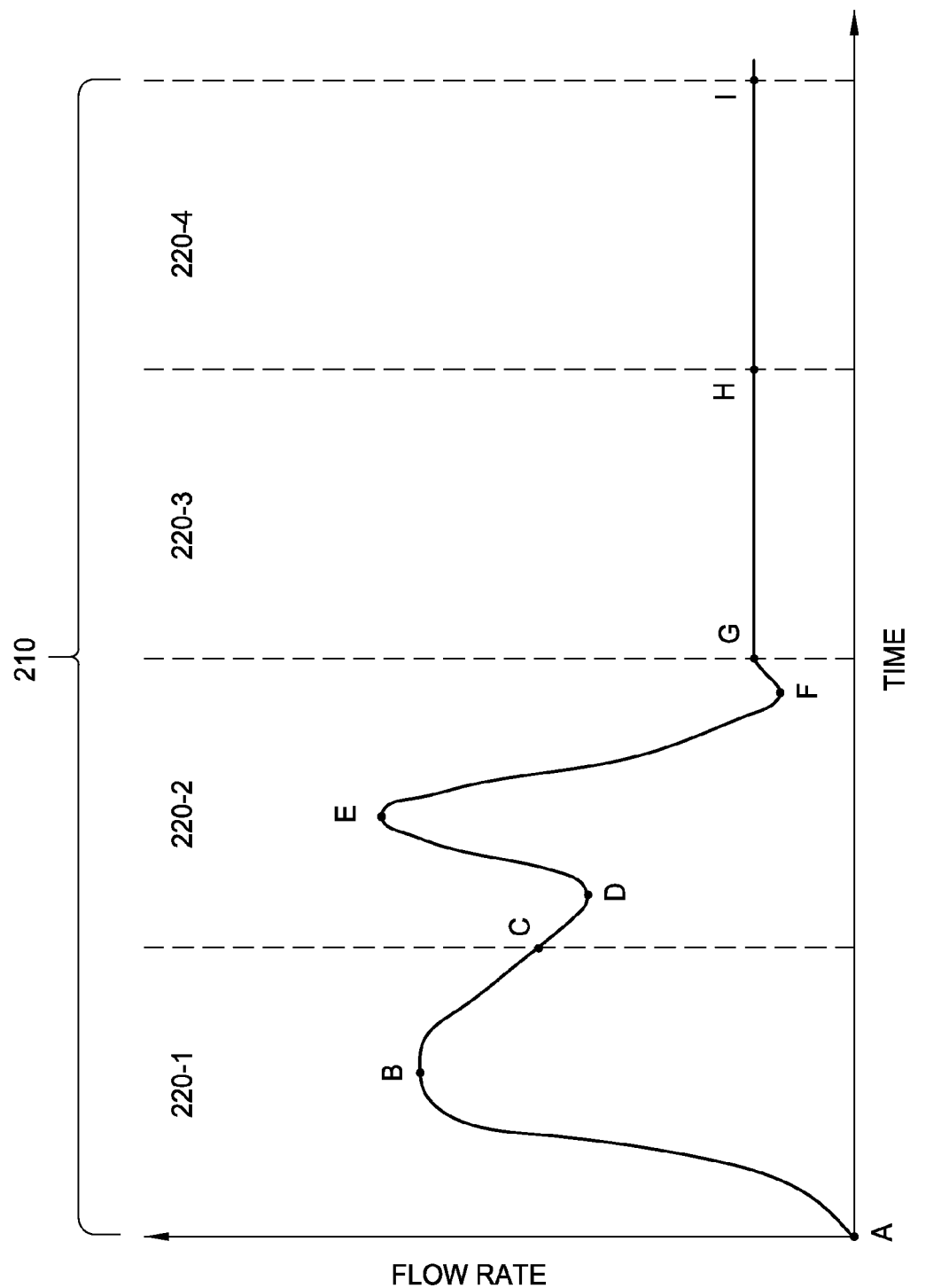
FIG. 2 illustrates process data acquired from an exemplary pipeline by a SCADA system as a function of time, according to one embodiment.

FIG. 2 illustrates process data acquired from an exemplary pipeline by the SCADA system 135 as a function of time. As shown, the time period 210 for which process data is acquired may be divided into a plurality of intervals $220_{1-4}$. Each interval $220_{1-4}$ may correspond to a particular duration of time (e.g., seconds, minutes, hours, days, etc.), a particular number of data points, etc. In the exemplary process data shown in FIG. 2, it is assumed that each interval corresponds to one hour of data acquisition. Thus, although the exemplary flow rate data is shown as a continuous line for ease of illustration, the flow rate data may consist of a plurality of distinct data points (e.g., hundreds of data points or more for each interval).

Each interval $220_{1-4}$ may be separately analyzed by the salient values engine 137, and one or more salient values associated with each interval $220_{1-4}$ may be transmitted to the analysis tool 172 (or analysis tool 162). In an exemplary embodiment, the salient values transmitted to the analysis tool 172 include the initial value, maximum value, minimum value, and local extrema (e.g., local maxima and minima) associated with each interval $220_{1-4}$ of time period 210. For example, the salient values engine 137 may analyze interval $220_1$ to determine that the initial flow rate occurs at point A, the minimum flow rate occurs at point A, and the maximum flow rate occurs at point B. The salient values engine 137 may further analyze the plurality of data points acquired from point A to point C and compute other statistics, such as the average value, the median value, the mode, etc. Similarly, the salient values engine 137 may analyze interval $220_2$ to determine that the initial flow rate occurs at point C, the minimum flow rate occurs at point F, and the maximum flow rate occurs at point E. The salient values engine 137 may further determine that a local extremum (i.e., a local minimum value) occurs at point D. These salient values then may be transmitted to the analysis tool 172.

Intervals $220_3$ and $220_4$ may be analyzed by the salient values engine 137 to determine that the initial value, maximum value, and minimum value all correspond to the substantially the same value (i.e., flow rate G=flow rate H=flow rate I). In response to such a determination, the salient values engine 137 may consolidate process data for intervals $220_3$ and $220_4$. For example, the salient values engine 137 may reduce the amount of process data transmitted while preserving the salient values associated with intervals $220_3$ and $220_4$. As applied to intervals $220_3$ and $220_4$ illustrated in FIG. 2, the process data transmitted by the salient values engine 137 may correspond to a single flow rate which represents the initial value, maximum value, and minimum value for intervals $220_3$ and $220_4$.

Additionally, in the response to a change in interval granularity, the salient values engine 137 may re-analyze the process data associated with time period 210. For example, the interval granularity may be decreased such that time period 210 corresponds to a single interval 220. In this case, the salient values engine 137 may analyze this interval 220 to determine that the minimum flow rate occurs at point A, the maximum flow rate occurs at point E, and local extrema occur at points B, D, F, and G. More specifically, points B and G may be determined to be local maxima, and points D and F may be determined to be local minima. Each of these salient values then may be transmitted to the analysis tool 172 in response to the change in interval granularity.

Thus, salient values may be preserved when interval granularity is modified, ensuring that important process data characteristics are not missed. Further, whereas conventional methods for responding to requests for process data may expend significant network resources (e.g., bandwidth) transmitting large amounts of data, the above-described method transmits a smaller volume of process data while retaining salient values associated with each of a plurality of intervals. Consequently, users connected to the SCADA system 135 through local and remote client devices 170, 160 are able to quickly navigate through and refine searches associated with large amounts of process data while being presented with the most important aspects of the process data. In addition, by dividing each request into a plurality of intervals and separately analyzing the process data acquired for each interval, important process data, such as initial values, local minima, and local maxima, are not discarded. Moreover, by enabling the user to adjust and update the interval granularity, intervals may be sized in a manner appropriate for a given process or set of circumstances.

Figure 3:
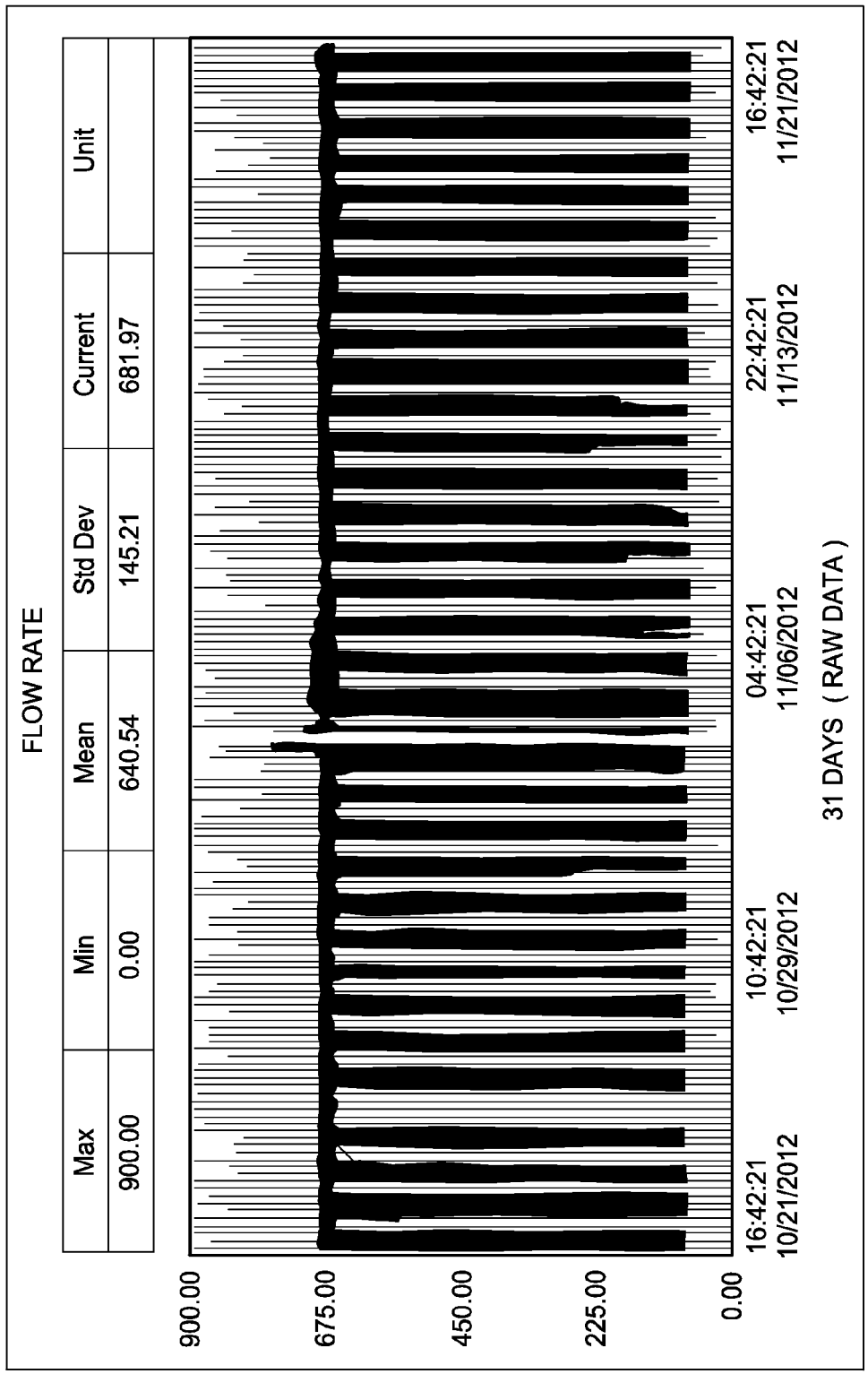
FIG. 3 is a graph of flow rate data acquired for an industrial process.

FIG. 3 is a graph of raw flow rate data acquired for an industrial process over a time period of 31 days. The raw flow rate data may include thousands of individual data points acquired over a 31-day time period. As shown, the flow rate repeatedly fluctuates between a maximum value of 900.00 and a minimum value of 0.00 during the 31-day time period.

Figure 4A:
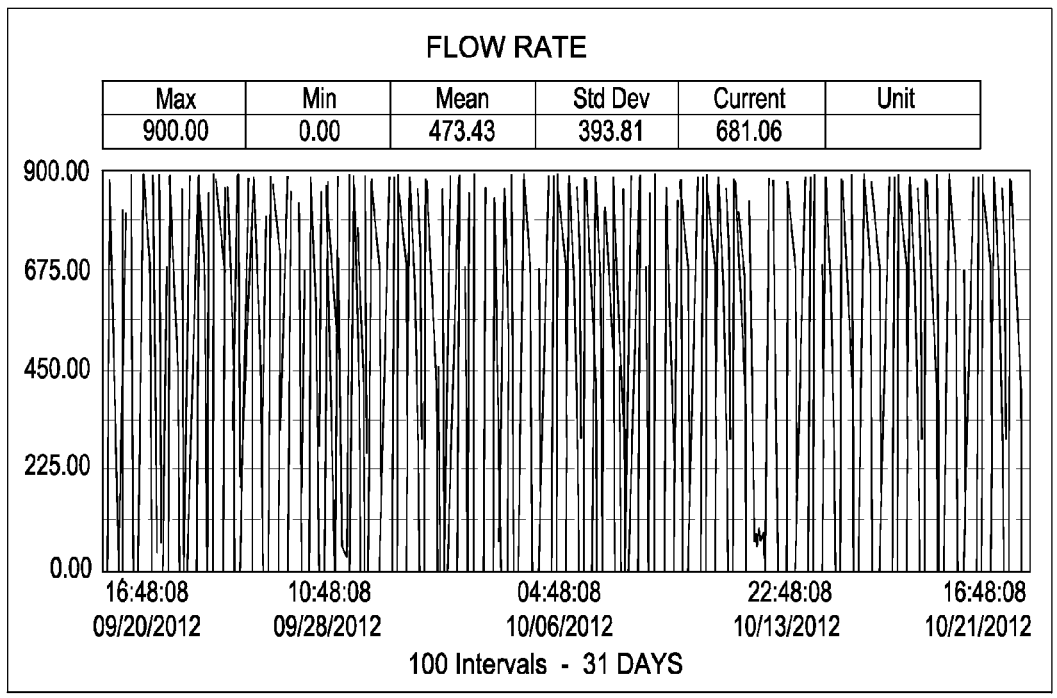
FIGS. 4A and 4B graph salient values determined from the raw flow rate data of FIG. 3, according to one embodiment.
Figure 4B:
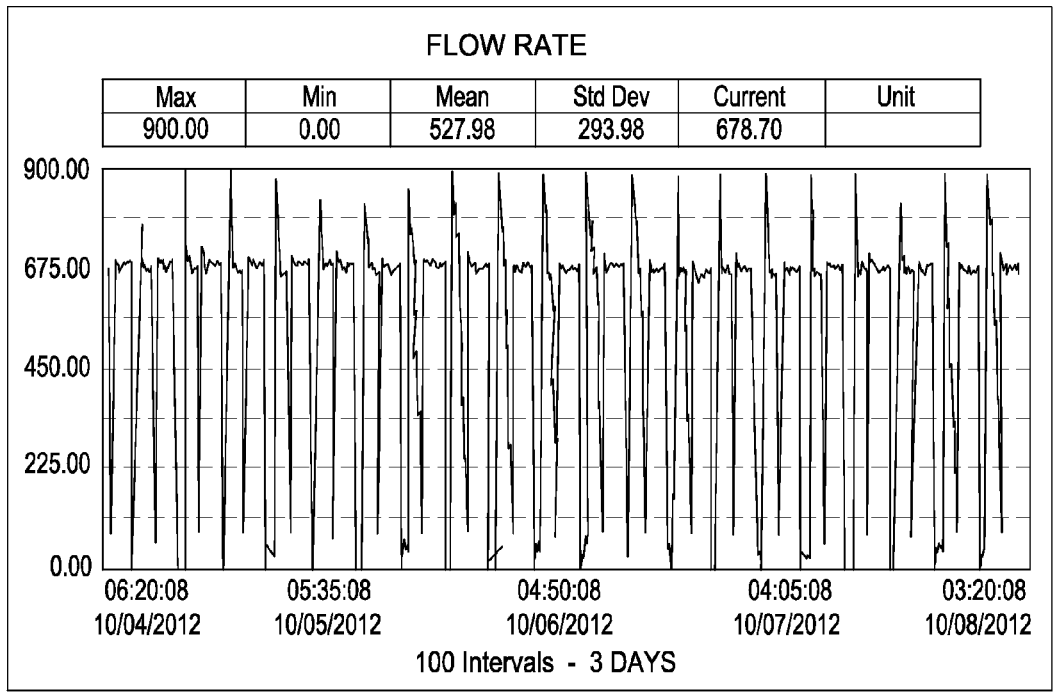

FIGS. 4A and 4B are graphs presenting salient values determined from the raw flow rate data of FIG. 3, as presented by the analysis tool 172. Salient values are presented for a time period of 31 days in FIG. 4A and a time period of 3 days in FIG. 4B. Each of the time periods illustrated in FIGS. 4A and 4B are divided into 100 intervals, and salient values, including the initial value, minimum value, maximum value, and local extrema are presented for each interval. As shown, the graph of salient values determined for the 31-day time period includes significantly fewer data points, and is significantly easier to read, than the graph of raw data illustrated in FIG. 3. In addition, this graph retains the salient characteristics of the raw data, such as the local extrema (e.g., local maxima and minima) associated with each interval.

FIG. 4B illustrates a further refinement of the flow rate data, in which a user has specified a time period of 3 days and requested salient values for each of 100 intervals within the 3-day time period. As shown, the data continues to preserve the salient values, in particular, the maxima and minima associated with each interval, even though X has changed. Doing so allows users of analysis tool 172 to observe the oscillation of the flow rate without downloading and sorting through large amounts of data.

Figure 5:
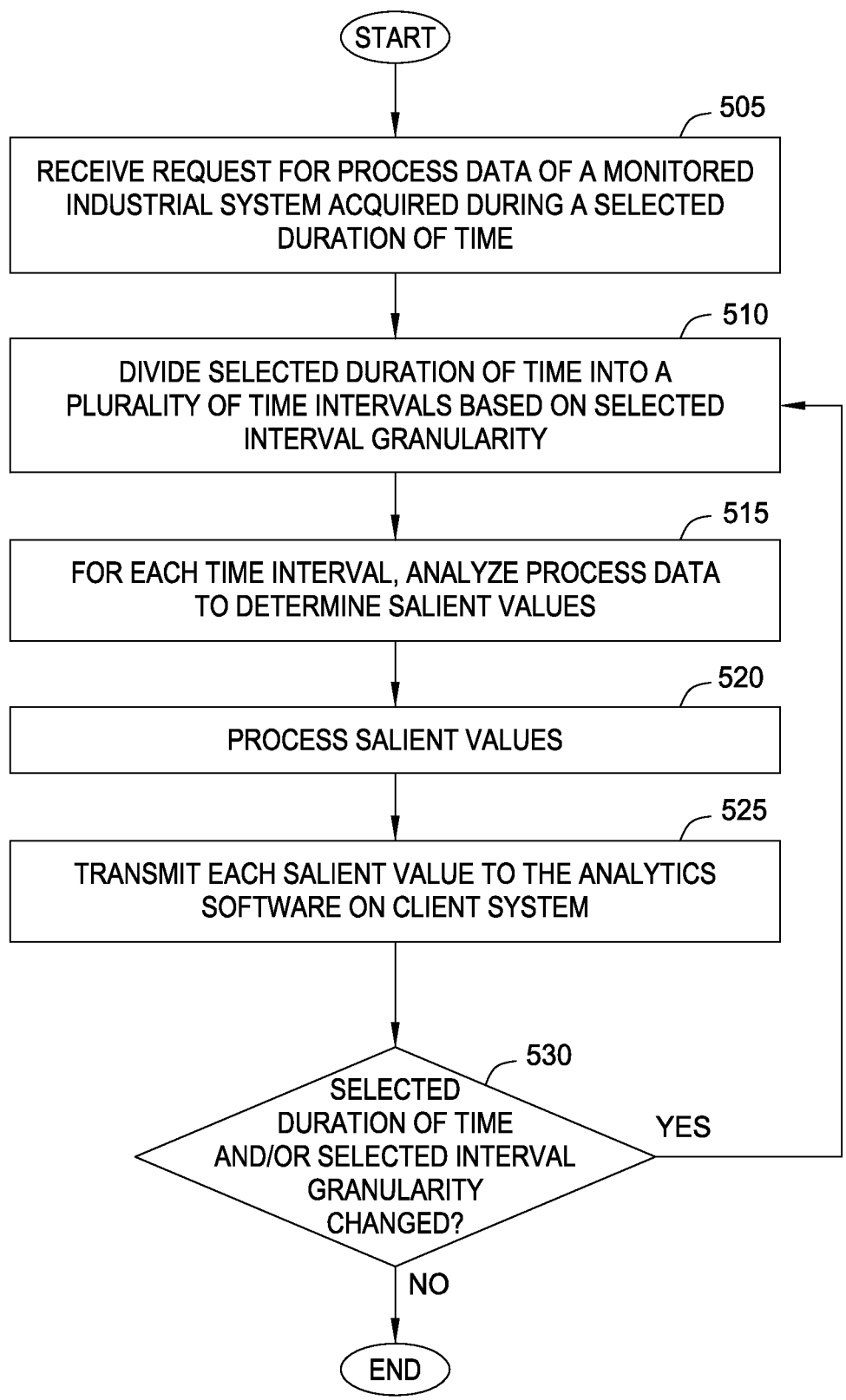
FIG. 5 illustrates a method for fulfilling a request for process data related to the operations of an industrial system, according to one embodiment.

FIG. 5 illustrates a method 500 for fulfilling a request for process data related to the operations of an industrial system, according to one embodiment of the invention. As shown, the method begins at step 505, where a request for process data of a monitored industrial system is received by the salient values engine 137 from an application program (e.g., analysis tool 172 or 162) executing on a client computing system (e.g., local client 170 or remote client 160). The request may specify a time period for which process data is desired. The request may further specify the number of intervals into which the specified time period is to be divided and the order in which the salient values are to be returned. Alternatively, the request may specify the size of each interval in units of time or number of data points.

Next, at step 510, the salient values engine 137 divides the time period into a number of intervals according to the specified interval granularity. At step 515, process data associated with each interval is retrieved from the real-time database 133 and/or historian database 134 and analyzed to determine one or more salient values for each interval. Determining salient values may include sorting raw data, selecting values from raw data, or performing calculations with raw data. The salient values determined for each interval may include an initial value, a maximum value, a minimum value, local extrema, and the like.

At step 520, the salient values engine 137 may process the salient values, as illustrated in further detail in the method 600 of FIG. 6, discussed below. At step 525, the SCADA system 135 transmits the salient values to the client system, and the analysis tool 172 (or analysis tool 162) renders a display of each salient value. Finally, at step 530, after receiving a request for process data and transmitting salient values to a client system, the salient values engine 137 may receive updated parameters from the user. For example, the user may modify the time period and/or interval granularity for which process data is requested. In response, the method 500 may return to step 510, where the time period is divided into a plurality of intervals, each of which are analyzed to determine one or more salient values.

Figure 6:
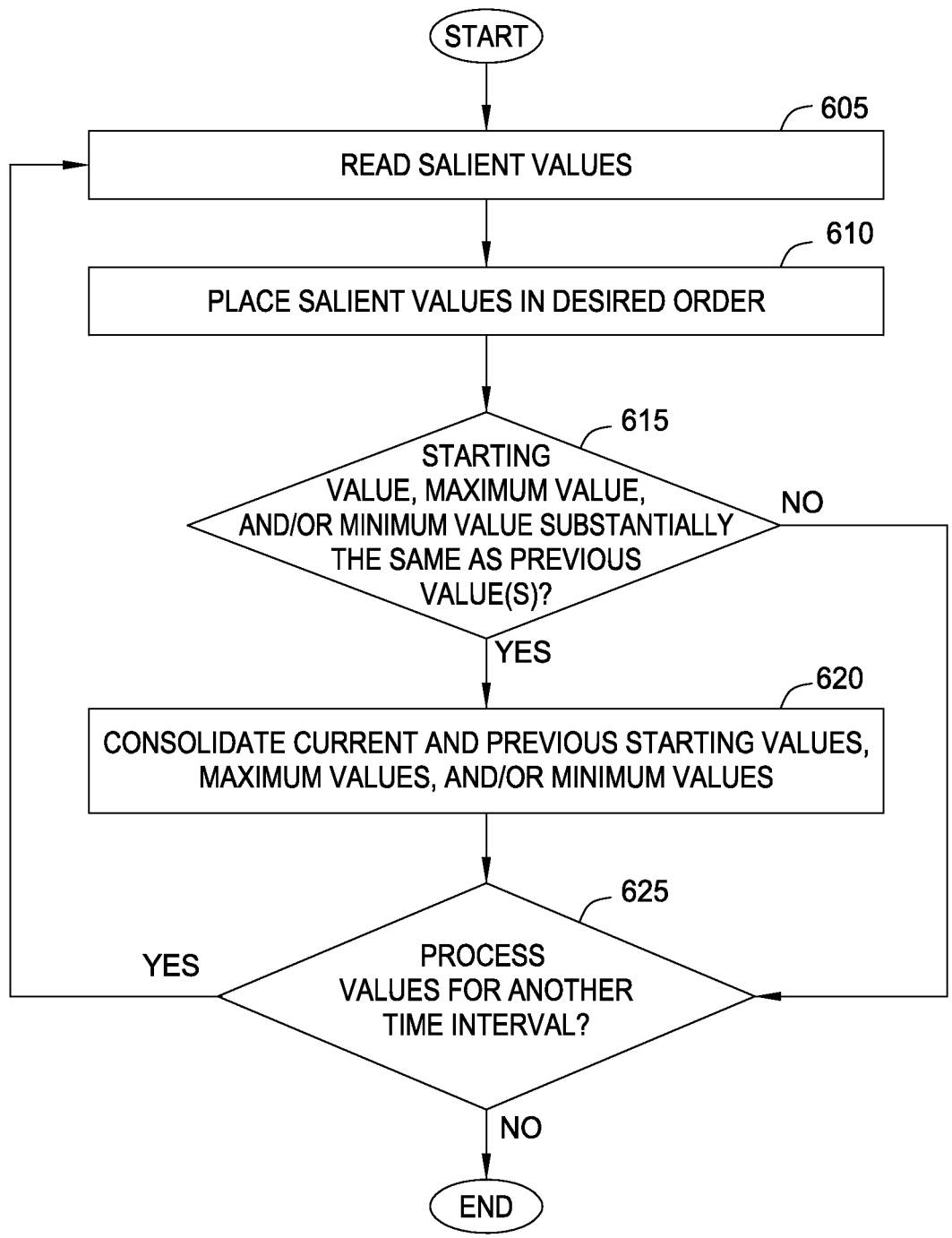
FIG. 6 illustrates a method for processing salient values related to the operations of an industrial system, according to one embodiment.

FIG. 6 illustrates a method 600 for processing salient values related to the operations of an industrial system, according to one embodiment of the invention. The method begins at step 605, where the salient values are read from the memory 136 of the SCADA system 135. The salient values may include, without limitation, an initial value, a maximum value, a minimum value, and local extrema. At step 610, the salient values may be arranged in a predetermined order. For example, the user may specify that, for each interval, the initial value is to be transmitted first, followed by the maximum and minimum values, and followed by local extrema. Thus, such a configuration may further increase the speed with which process data is requested and received from the SCADA system 135, since the ordered salient values, and not labels or meta data associated with each salient value or interval, is transmitted to the client system.

Next, at step 615, the salient values engine 137 may process the salient values to determine that the values associated with a plurality of consecutive intervals are identical or substantially the same. In response to this determination, the salient values engine 137 may consolidate the one or more salient values at step 620. Consolidation may include, without limitation, removing one or more of the salient values, associating a single salient value with a plurality of intervals. Finally, at step 625, the salient values engine 137 determines whether salient values are to be processed for another interval.

In sum, upon request, large amounts of process data related to the operations of an industrial system may be divided into discrete intervals, and the process data associated with each interval may be analyzed to determine one or more salient values representative of the interval. The salient values then may be transmitted to the user in response to the request. One advantage of this approach is that it enables users connected through a network having limited bandwidth to quickly and efficiently access and analyze industrial process data to identify real-time trends, malfunctions, inefficiencies, and the like.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

What is claimed:

1. A method for fulfilling a request for process data related to the operations of a monitored system comprising:
   receiving, from an application program executing on a client computing system, a first selected interval granularity and a request for process data associated with a first time period;
   dividing the first time period into a first plurality of intervals based on the first selected interval granularity;
   for each interval in the first plurality of intervals, analyzing the process data of the monitored system to determine salient values, the salient values comprising an initial value, a maximum value, a minimum value, and any local extrema of the process data of the monitored system; and
   transmitting the salient values associated with the first plurality of intervals to the application program, wherein the application program is configured to render a graph of the process data according to the first selected interval granularity, wherein the graph preserves the salient values irrespective of a selected interval granularity.

2. The method of claim 1, further comprising:
   receiving, from the application program, a second selected interval granularity; and
   responsive to the second selected interval granularity:
      dividing the first time period into a second plurality of intervals based on the second selected interval granularity, wherein the second plurality of intervals are different than the first plurality of intervals;
      for each interval in the second plurality of intervals, analyzing the process data of the monitored system to determine the salient values; and
      transmitting the salient values associated with the second plurality of intervals to the application program, wherein the application program is configured to render a graph of the process data according to the second selected interval granularity while preserving the salient values.

3. The method of claim 1, further comprising:
   receiving, from the application program, a request for process data of the monitored system acquired during a second time period; and
   responsive to the request:
      dividing the second time period into a second plurality of intervals based on the first selected interval granularity;

for each interval in the second plurality of intervals, analyzing the process data to determine the salient values; and transmitting the salient values associated with the second plurality of intervals to the application program, wherein the application program is configured to render a graph of the process data according to the first selected interval granularity while preserving the salient values.

4. The method of claim 1, further comprising reordering the initial value, maximum value, minimum value, and any local extrema associated with each interval prior to transmitting each initial value, maximum value, minimum value, and any local extrema to the application program.

5. The method of claim 1, further comprising:
determining that the salient values associated with at least two consecutive intervals in the first plurality of intervals are substantially the same; and
based on the determination, consolidating one or more salient values associated with the at least two consecutive intervals prior to transmitting the salient values to the application program.

6. The method of claim 5, wherein the consolidating comprises removing one or more salient values associated with the at least two consecutive intervals.

7. A non-transitory computer-readable storage medium including instructions that, when executed by a processing unit, cause the processing unit to fulfill a request for process data related to the operations of a monitored system, by performing the steps of:
receiving, from an application program executing on a client computing system, a first selected interval granularity and a request for process data associated with a first time period;
dividing the first time period into a first plurality of intervals based on the first selected interval granularity;
for each interval in the first plurality of intervals, analyzing the process data of the monitored system to determine salient values, the salient values comprising an initial value, a maximum value, a minimum value, and any local extrema of the process data of the monitored system; and
transmitting the salient values associated with the first plurality of intervals to the application program, wherein the application program is configured to render a graph of the process data according to the first selected interval granularity, wherein the graph preserves the salient values irrespective of a selected interval granularity.

8. The non-transitory computer-readable storage medium of claim 7, further comprising:
receiving, from the application program, a second selected interval granularity; and responsive to the second selected interval granularity:
dividing the first time period into a second plurality of intervals based on the second selected interval granularity, wherein the second plurality of intervals are different than the first plurality of intervals;
for each interval in the second plurality of intervals, analyzing the process data of the monitored system to determine the salient values; and
transmitting the salient values associated with the second plurality of intervals to the application program, wherein the application program is configured to render a graph of the process data according to the second selected interval granularity while preserving the salient values.

9. The non-transitory computer-readable storage medium of claim 7, further comprising:
receiving, from the application program, a request for process data of the monitored system acquired during a second time period; and
responsive to the request:
dividing the second time period into a second plurality of intervals based on the first selected interval granularity;
for each interval in the second plurality of intervals, analyzing the process data to determine the salient values; and
transmitting the salient values associated with the second plurality of intervals to the application program, where in the application program is configured to render a graph of the process data according to the first selected interval granularity while preserving the salient values.

10. The non-transitory computer-readable storage medium of claim 7, further comprising reordering the initial value, maximum value, minimum value, and any local extrema associated with each interval prior to transmitting each initial value, maximum value, minimum value, and any local extrema to the application program.

11. The non-transitory computer-readable storage medium of claim 7, further comprising:
determining that the salient values associated with at least two consecutive intervals in the first plurality of intervals are substantially the same; and
based on the determination, consolidating one or more salient values associated with the at least two consecutive intervals prior to transmitting the salient values to the application program.

12. The non-transitory computer-readable storage medium of claim 11, wherein the consolidating comprises removing one or more salient values associated with the at least two consecutive intervals.

13. A computing device, comprising:
a memory; and
a processing unit coupled to the memory, configured to perform an operation to fulfill a request for process data related to the operations of a monitored system, the operation comprising:
receiving, from an application program executing on a client computing system, a first selected interval granularity and a request for process data associated with a first time period;
dividing the first time period into a first plurality of intervals based on the first selected interval granularity;
for each interval in the first plurality of intervals, analyze the process data of the monitored system to determine salient values, the salient values comprising an initial value, a maximum value, a minimum value, and any local extrema of the process data of the monitored system; and
transmitting the salient values associated with the first plurality of intervals to the application program, wherein the application program is configured to render a graph of the process data according to the first selected interval granularity, wherein the graph preserves the salient values irrespective of a selected interval granularity.

14. The computing device of claim 13, wherein the central processing unit is further configured to:
receive, from the application program, a second selected interval granularity; and responsive to the second selected interval granularity:
  divide the first time period into a second plurality of intervals based on the second selected interval granularity, wherein the second plurality of intervals are different than the first plurality of intervals;
  for each interval in the second plurality of intervals, analyze the process data of the monitored system to determine the salient values; and
  transmit the salient values associated with the second plurality of intervals to the application program, wherein the application program is configured to render a graph of the process data according to the second selected interval granularity while preserving the salient values.

15. The computing device of claim 13, wherein the central processing unit is further configured to:
  receive, from the application program, a request for process data of the monitored system acquired during a second time period; and
  responsive to the request:
    divide the second time period into a second plurality of intervals based on the first selected interval granularity;
    for each interval in the second plurality of intervals, analyze the process data to determine the salient values; and
    transmit the salient values associated with the second plurality of intervals to the application program, wherein the application program is configured to render a graph of the process data according to the first selected interval granularity while preserving the salient values.

16. The computing device of claim 13, wherein the central processing unit is further configured to reorder the initial value, maximum value, minimum value, and any local extrema associated with each interval prior to transmitting each initial value, maximum value, minimum value, and any local extrema to the application program.

17. The computing device of claim 13, wherein the central processing unit is further configured to:
  determine that the salient values associated with at least two consecutive intervals in the first plurality of intervals are substantially the same; and
  based on the determination, consolidate one or more salient values associated with the at least two consecutive intervals prior to transmitting the salient values to the application program.

18. The computing device of claim 17, wherein the consolidating comprises removing one or more salient values associated with the at least two consecutive intervals.

19. A non-transitory tangible machine-readable storage medium comprising instructions for:
  transmitting a selected interval granularity and a request for process data associated with a first time period;
  receiving the process data associated with the first time period as a plurality of intervals of process data grouped based upon the selected interval granularity;
  receiving salient values for each interval of the plurality of intervals of process data, wherein the salient values comprises an initial value, a maximum value, a minimum value, and any local extrema of the process data of the monitored system;
  generating a visual indication of the plurality of intervals of process data and the salient values; and
  storing the salient values.

* * * * *